Figure 2:
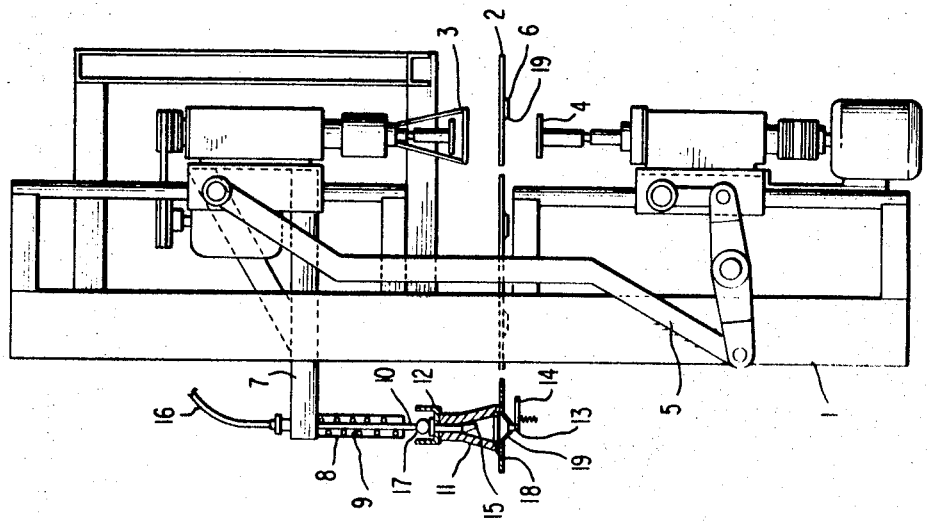
Figure 1:
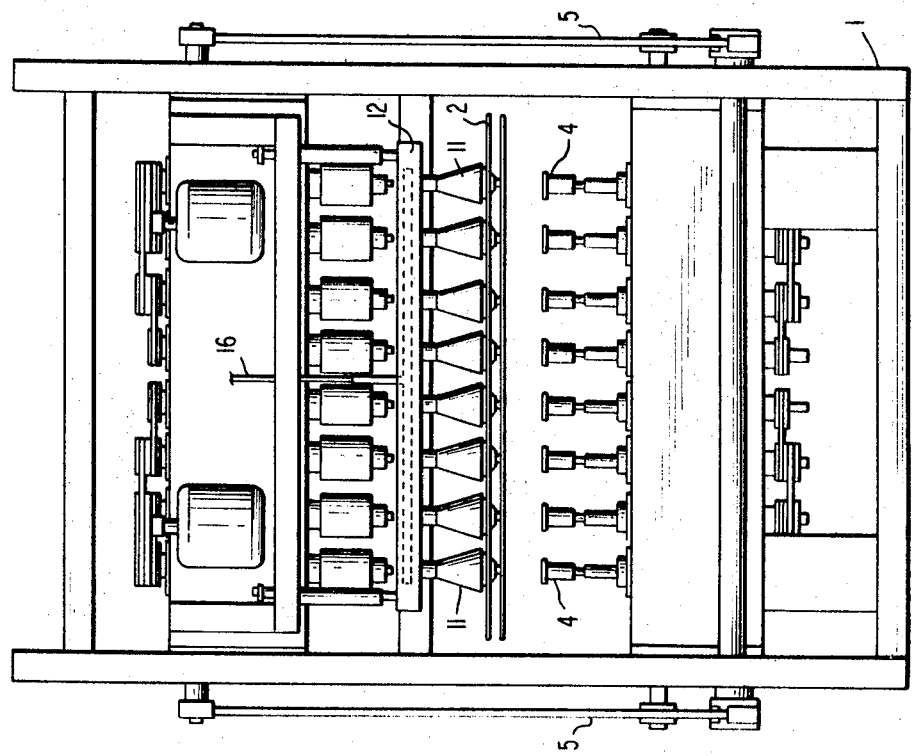

United States Patent

[11] 3,602,279

| [72] | Inventor | Albertus Van Raaij<br>Debbesholk 18, Ulft, Netherlands |
|---|---|---|
| [21] | Appl. No. | 811,767 |
| [22] | Filed | Apr. 1, 1969 |
| [45] | Patented | Aug. 31, 1971 |

[54] MACHINE FOR SKINNING ONIONS AND LIKE BULB-TYPE VEGETABLES
4 Claims, 2 Drawing Figs.

| [52] | U.S. Cl. | 146/43 R |
|---|---|---|
| [51] | Int. Cl. | A23n 7/00 |
| [50] | Field of Search | 146/43, 83 |

[56] References Cited
UNITED STATES PATENTS

| 2,445,881 | 7/1948 | Hemmeter | 146/43 |
|---|---|---|---|
| 2,766,794 | 10/1956 | Odale | 146/43 X |
| 3,485,279 | 12/1969 | Parsons | 146/43 X |

*Primary Examiner*—Willie G. Abercrombie
*Attorney*—Joseph Zallen

ABSTRACT: A machine for skinning onions and bulblike plats is described. Openings or depressions are provided for receiving the onions after the head and root portions have been removed. A holder which moves up and down is included which has a blower nozzle which permits pressurized gas to blow off the outer skin.

PATENTED AUG 31 1971

3,602,279

INVENTOR
ALBERTUS VAN RAALT

BY Joseph Zoller
ATTORNEY

MACHINE FOR SKINNING ONIONS AND LIKE BULB-TYPE VEGETABLES

BACKGROUND OF INVENTION

The invention relates to machines for skinning or peeling onions or like vegetables.

Dutch Pat. application No. 285,343 discloses a machine for removing the head and root portions of vegetables (plants), in particular onions, in which machine there is provided a conveyor belt for feeding the vegetables. During operation of the machine the conveyor belt is intermittently moved along its path of conveyance and is stationary while the actual processing of the vegetables is taking place. The machine comprises, on one side of the conveyor belt, an assembly for removing the heads of the vegetables and, on the other side of the belt, an assembly for removing the root portions of the vegetables. During the processing of the vegetables these two mechanical assemblies are moved towards one another, the onions being firmly gripped by resiliently mounted members, knives being then set in motion for removing the head and root portions of the vegetables.

It is frequently necessary, after the onions have been thus treated, to remove the outermost skin or skins therefrom.

The present application relates to a machine which is particularly adapted for use with a machine of the kind just mentioned and in which the onion, after its head and root portions have been removed, undergoes a further operation in which its outermost skin or skins are removed.

SUMMARY OF INVENTION

The invention consists in providing in a machine for skinning onions or like vegetables which is provided with a conveyor plate, conveyor table or conveyor belt having openings or recessed portions for receiving the onions whose head and root portions have already been removed—a funnel-shaped element for the onions or other vegetables and which is capable of being moved upwards and downwards above the conveyor devices, this funnel-shaped element being provided with a blower nozzle which is directed on to the onion and is connected to a storage tank for a pressurized gas.

The machine may be so synchronized with the apparatus for removing the head and root portions from the onion that, while the onion is being subjected to the last-mentioned processes or preparatory treatment and while the conveyor belt is thus stationary for the purpose, the member serving to blow away the outermost skin of the onion is moved downwards and the pneumatic device is caused to start operation by opening a valve or cock. Meanwhile the onion is preferably lying above an opening in the conveyor belt.

The blower air may possibly, though not necessarily, be heated and it will be understood that in this way the outermost skin or, if necessary, the outermost skins, of the onion will be efficiently removed. After the different processing treatments have been carried out the conveyor belt moves on, and the finally prepared onion can be guided out of the machine and safely deposited in a suitable storage container.

The blower nozzle is preferably slightly obliquely and downwardly directed to the vertical axis, so that the blower air will be directed on to the outer skin, with the result that the onion will execute a rotational movement during processing; in this way it is ensured that the whole surface area of the onion will be exposed at least once to the air stream.

It is possible to provide, under the belt on which the lower part of the onion rests, a pin which is centrally located with respect to the blower device. While the belt is stationary this pin is guided with a determined clearance through the opening in the belt and is movable up and down in synchronism with the processing operation referred to above so that, while air is being blown on to the onion, the onion will be lifted up to a determined extent and the opening in the conveyor belt is freed so as to allow the compressed air used for blowing to pass out. The action of lifting the onion also assists in causing the onion to carry out a rotary motion, already referred to, in the air stream. The upper holder is preferably shaped as a funnel and its lower edge, that is to say at which its diameter is the greatest, is preferably made of rubber; when the funnel-shaped part is moved downwards the rubber edge or rim portion is pressed, together with the blower nozzle, against the conveyor belt, so that in this position a tight-sealing connection is established and the compressed air will be blown in the correct direction.

SPECIFIC EXAMPLE OF INVENTION

One embodiment of this invention is hereinafter described with reference to the accompanying diagrammatic drawings:

FIG. 2 (side view) and

FIG. 2 (end view).

The right-hand part of the drawing diagrammatically represents the machine, described in the Dutch patent application hereinbefore referred to above, for removing the head and root portion from the onion. Parts of the machine which are of no importance to the invention are omitted from the drawing. The machine consists of a frame 1 in which the movable members for removing the heads and root portions from the onions are mounted. The conveyor device which is in the form of a belt is diagrammatically represented and designated as 2; it may be assumed to move towards the left. As soon as a holder 6 for an onion arrives exactly between the cutting (slicing) elements 3 and 4, the conveyor belt is momentarily stopped and the cutting (slicing) elements 3 and 4 perform their allotted functions. The elements 3 and 4 are coupled by means of a connecting rod 5 in such manner that at this moment they move towards one another and grip the onion. For the purpose of making the required adjustment to different sizes of onions, the cutting elements 3 and 4 are resiliently connected to their associated cylinders which carry out the upward and downward movements. The whole assembly is driven by an electric motor.

At a determined instant of time a treated onion comes into position below the funnel-shaped part 11 which has been raised during the continued movement of the conveyor; at this instant the conveyor belt is stopped for a determined length of time. The funnel-shaped part 11 is moved downwards in synchronism with the cutting elements 3 and 4; and the onion is surrounded by the funnel-shaped recess or cavity. The mutual connection between, on the one hand, the cutting (slicing) members and, on the other hand, the members for skinning the onions is constituted by an element 7 which serves as a guide means for cylinder 8, in which a spring 9 is located, and which also contains a duct for the compressed air which is supplied through pipe 16. During the upwards movement of the part 11 the spring 9 in compressed, while the admission valve 17 for compressed air is closed. It is possible to provide a number of these parts and a number of cutting (slicing) devices in series and in mutual alignment, section irons 12 serving to connect together the different funnel-shaped parts 11. As soon as the onion has arrived in the vicinity of the part 11, the part 11 is moved downwards; a sealing edge or rim portion 18, which is made of rubber for example, forms a tight-sealing connection between the part 11 and the part of the conveyor belt which surrounds the said recess or depression 19 formed in the depression 19. The recess or depression 19 is provided in its central region with an opening; a pin 13 is adapted to be guided through this opening in synchronism with the blower part, and is provided at the end of a resilient part 14. Through the intermediary of a coupling means which is not shown in the drawing, pin 13 is pressed upwards into the position shown, so as thereby to raise the onion a short distance. Concurrently with this movement, which occurs when the conveyor belt is stationary, the air-admission valve 17 is opened, whereupon a strong jet of air is blown on to the upper region of the onion and strikes against at least the outermost skin of the onion. At the same time the onion starts to turn. The nozzle 15 may also be caused to rotate through the intermediary of a transmission (not shown), so that the whole surface area of the onion is treated. It will be readily appreciated that, in this way, the outermost skin of the onion will easily become loosened so that it will fall off in the course of further movement and after the part 11 has been raised together with the nozzle.

After completion of the processing operation the elements 3 and 4 are once again moved away from each other and the skinning or peeling parts 11, 15 are moved upwards again, whereupon the conveyor belt can continue its forward movement for the purpose of treating the next following onion in the same way as is described above.

I claim:

1. Machine for skinning onions and like bulb-type vegetables comprising: conveyor means having depressions adapted to freely support onions or the like whose head and root portions have already been removed; an inverted cup-shaped holder spaced above said conveyor means and movable up and down with respect to said conveyor means so as to cooperate with a said depression in containing a said onion or the like; a blower nozzle coupled to said cup-shaped holder; a source of air under pressure connected with said blower nozzle; and valve means between said blower nozzle and said source of air for admitting air to the blower nozzle in the lowermost part of said cup-shaped holder.

2. The machine of claim 1 wherein the axis of the debouchment of the blower nozzle has been located eccentrically with respect to the middle of said holder and is inclined towards said conveyor means.

3. The machine of claim 1, wherein under the conveyor means is a pin located opposite an opening in the conveyor means when said conveyor means stand still, said pin being coupled with said holder for movement to and from said conveyor means such that the pin moves opposite to the holder through an aperture in the depression so as to lift a said contained onion or the like.

4. The machine of claim 1, wherein the holder is formed as an inverted funnel and has a sealing ring at its lower end.